United States Patent
Schellstede

[11] Patent Number: 5,242,245
[45] Date of Patent: Sep. 7, 1993

[54] METHOD AND APPARATUS FOR VACUUM ENHANCED THERMAL DESORPTION OF HYDROCARBON AND OTHER CONTAMINANTS FROM SOILS

[76] Inventor: Herman J. Schellstede, 342 Duperior Ave., New Iberia, La. 70560

[21] Appl. No.: 749,043

[22] Filed: Aug. 22, 1991

[51] Int. Cl.[5] .............................................. B09B 3/00
[52] U.S. Cl. ................................. 405/128; 110/346
[58] Field of Search .................... 405/128, 129, 131; 175/66, 206; 432/13, 14, 72, 134, 139; 110/346, 236, 246, 237

[56] References Cited

U.S. PATENT DOCUMENTS

| | | | |
|---|---|---|---|
| 4,139,462 | 2/1979 | Sample, Jr. | 210/72 |
| 4,140,478 | 2/1979 | Kawakani et al. | 432/13 |
| 4,313,785 | 2/1982 | Schellstede | 159/6 |
| 4,424,081 | 1/1984 | Giguere | 134/10 |
| 4,451,231 | 5/1984 | Murray | 432/13 |
| 4,504,222 | 3/1985 | Christian | 432/139 |
| 4,576,572 | 3/1986 | Mueller et al. | 432/13 |
| 4,600,379 | 7/1986 | Elliott | 432/13 |
| 4,606,283 | 8/1986 | DesOrmeaux | 110/250 |
| 4,654,150 | 3/1987 | Young | 210/774 |
| 4,667,609 | 5/1987 | Hardison et al. | 110/236 |
| 4,738,206 | 4/1988 | Noland | 110/346 |
| 4,774,007 | 9/1988 | Gordon | 210/766 |
| 4,784,603 | 11/1988 | Robak et al. | 432/72 X |
| 4,815,398 | 3/1989 | Keating, II | 110/233 |
| 4,827,854 | 5/1989 | Collette | 110/237 |
| 4,864,942 | 9/1989 | Fochtman et al. | 110/226 |
| 4,889,484 | 12/1989 | Przewaiski | 432/103 |
| 4,915,038 | 4/1990 | Sujata et al. | 110/346 |
| 4,927,293 | 5/1990 | Campbell | 405/128 |
| 4,945,839 | 8/1990 | Collette | 110/212 |
| 4,947,767 | 8/1990 | Colletten | 110/212 |
| 4,951,417 | 8/1990 | Gerden et al. | 47/1.42 |
| 4,957,429 | 9/1990 | Mendenhall | 432/14 |
| 4,961,391 | 10/1990 | Mak et al. | 110/346 |
| 4,974,528 | 12/1990 | Barcell | 110/346 X |
| 5,078,836 | 1/1992 | Hogan | 201/7 |
| 5,085,581 | 2/1992 | Mendenhall | 432/14 X |
| 5,088,856 | 2/1992 | Yocum | 405/131 X |

Primary Examiner—Dennis L. Taylor
Attorney, Agent, or Firm—Dowell & Dowell

[57] ABSTRACT

A method and apparatus for recovering hydrocarbons from soils which includes introducing the soil material to be treated through a vacuum seal and into a thermal processor which is operated under reduced pressure. The processor includes a centralized heating unit surrounded by concentrically mounted rotatable cylinders. One of the cylinders has a continuous auger extending from the surface thereof and proximate to the other cylinder by way of which the material is conveyed through the processor with a relative of rotation of the cylinders being controlled to ensure optimum vapor separation of the hydrocarbons at low temperature after which the vapors are recovered and condensed. In a preferred embodiment an expansion chamber and supplemental concentric auger heater are used to insure substantial complete separation of the hydrocarbons from the soil prior to discharging the treated soil from the apparatus.

40 Claims, 7 Drawing Sheets

METHOD AND APPARATUS FOR VACUUM ENHANCED THERMAL DESORPTION OF HYDROCARBON AND OTHER CONTAMINANTS FROM SOILS

BACKGROUND OF THE INVENTION

1. Field of the Invention

This invention is generally directed to systems and equipment for recovering contaminants and particularly hydrocarbons from other materials and especially to a system for recovering hydrocarbons from soils. The hydrocarbon contaminants may be in varied forms but are generally gasoline, diesel fuels and oils such as heating and crude oils. The method of the present invention involves introducing the contaminated soil into a thermal desorption unit where it is conveyed and exposed to temperatures which are supplied centrally with respect to at least one annular conveying chamber created by two concentric cylindrical rotors. The material is introduced under vacuum and the material is conveyed under partial vacuum as it is heat treated. The heat of the vapor is maintained relatively low due to the reduced atmosphere within the thermal desorption unit and the rate of conveyance of the material through the unit is varied so as to insure that contaminants are completely vaporized before the material is discharged from the desorption unit. Vapors are withdrawn under vacuum and are separated from fines which are returned to the processing unit while the vapor is condensed and separated thereby recapturing the hydrocarbons for further use.

In the preferred embodiment, the thermal desorption apparatus of the present invention includes two horizontally disposed and concentrically oriented material conveying cylinders which are rotatably mounted with respect to a common support base. The cylinders are mounted about one or more axially disposed heating units which are preferably electrical heaters. Material to be treated is introduced through a vacuum feed system and is introduced at a variable control rate depending upon sensed parameters of the operating system. The material is introduced into an annular conveyance passageway defined between the two rotating cylinders with the rate of conveyance being determined again by operating parameters depending upon the type of material being treated, the contaminants to be removed and the moisture content of the material. The apparatus further provides for the removal and separation of vapors utilizing separators which maintain the conveyance area between the rotating cylinders at a reduced pressure so that the amount of energy necessary to heat the material to vaporize volatile contaminants is significantly reduced. The heat exchanger design insures that all heat generated must pass through the material being treated. A cyclone separator is provided for separating vapors from the conveyance area between the rotating cylinders of the heat exchangers and vapors are also received from an expansion chamber or secondary cyclone separator mounted between first and second sets of heat exchange and material conveyance cylinders.

2. History of the Related Art

Hydrocarbon pollution and contamination of soil areas is an ever growing problem which requires the immediate concern of individuals as well as government and private agencies. The destruction to the environment through accidental spills of oil and other hydrocarbon products damages thousands and possibly millions of acres of shoreline and other onshore areas worldwide each year. Over the years numerous techniques have been proposed for cleaning hydrocarbon spills and recovering hydrocarbon products, however most systems have dealt with recovering bulk liquids without providing an adequate solution for separating oils and other hydrocarbons entrained in the soil. Some methods of recovering hydrocarbons involve the use of solvents which are sprayed or applied across the soil after which the soil is treated with steam to break the hydrocarbons down chemically. Unfortunately, this type of recovery does not adequately separate sufficient hydrocarbons from the soil and often results in allowing hydrocarbons to seep deeper within the soil creating even greater contamination to subsurface soil areas. Further, as a result of steam treatment type procedures, the hydrocarbons may be contained in runoffs which are directed to streams and rivers remote from the contaminated site thereby causing additional ecological damage.

In oil field technology there have been numerous devices developed for separating contaminants and hydrocarbons from cuttings waste both in oil base and water base drilling fluid systems. In such systems, during the process of drilling a well, drilling fluids are utilized to flush away down hole cuttings at the point where the drill bit cuts through the earth. Thereafter, the drilling fluid is conveyed above ground where the drilling fluid is sifted and otherwise treated to remove cuttings and other contaminants from the fluid.

In U.S. Pat. No. 4,313,785 to the inventor of the present application for patent, a method and apparatus is disclosed for removing hydrocarbons which adhere to fragments of rock produced during well drilling operations and, in particular, where an oil base drilling fluid is used during such operations. The method and apparatus involve a two-stage process for burning hydrocarbons and other volatile materials from cuttings wherein each stage of the apparatus are mounted upon a common rotatable shaft for transferring the materials from one stage to the other. The system is designed to utilize some of the waste gas recovered during the treatment process for purposing of providing heat for vaporizing hydrocarbons from the solid material. The apparatus includes at least one burner wherein the contaminated material is introduced and conveyed by means of rotatable augers. The side walls of the burners or heating units have heating elements embedded therein and in some instances other combustion or heated gas may be blown through the units. Within the device, the material is heated as it is conveyed therethrough with the volatile materials being separated as the temperature is raised significantly in a first stage. Thereafter, the solid material is discharged to a second rotating conveyor unit wherein further separation of the less volatile components is accomplished by supplying additional heat. The patent further discusses that the heating and separator unit not only has potential for use in oil field technology but also may be utilized to treat low levels of hydrocarbon contamination such as is present and occurs along beaches and the like where oil spills have accumulated on sand. The unit was therefore designed to be portable to allow a wide range of uses for separating hydrocarbons from various types of soils.

Unfortunately, the previous unit is not sufficiently efficient and requires the generation of excessive energy to heat materials being treated which makes the unit impractical for use in many areas, especially where lower levels of hydrocarbon contamination are encountered. In addition, the system did not provide for adequately regulating the conveyance of materials through the heating unit to insure optimum separation of the volatile components with the rate of conveyance being automatically controlled by monitoring parameters of the materials as they are treated.

Another type of system for extracting contaminants such as hydrocarbons from cutting wastes in oil field well drilling is disclosed in U.S. Pat. No. 4,606,283 to DesOrmeaux et al. This patent describes a system for extracting volatile hydrocarbons from cutting wastes wherein the material to be treated is introduced into hoppers which feed a plurality of screw conveyors which are horizontally mounted on a base unit. The screw conveyors include heating elements disposed in the outer walls which heating elements are utilized to generate sufficient heat to vaporize the more volatile components from the solids of the cutting fluid. The vapors are separated and the dried material discharged for further disposal. As with the aforementioned system embodied in U.S. Pat. No. 4,313,785, the system disclosed in U.S. Pat. No. 4,606,283 requires an excessive amount of energy input in order to accomplish separation of hydrocarbons from cutting fluids. The process does not provide optimum separation of volatile components under conditions which prevent the release of contaminated vapors to the surrounding environment and does not provide a system which is economically feasible especially in areas where low levels of hydrocarbon contamination are encountered.

SUMMARY OF THE INVENTION

This invention is directed to a method and apparatus for efficiently separating hydrocarbons and other contaminants from soils especially in areas where gasoline, crude oils, home heating oils, diesel fuels and the like, have been released accidently into areas where significant ecological damage may occur. The process involves grading or separating the material and thereafter introducing the contaminated material into a thermal desorption unit which is maintained under partial vacuum with the pressure during operation being maintained at approximately 350 Torr or less, in order to lower the boiling temperature of the liquid contaminants. The method also involves supplying heat to the material which is conveyed by pairs of rotatable cylinders which are disposed in concentric relationship about one or more axially disposed heating elements so that all heat must pass from the heating elements through the conveying units and material to be treated to the surrounding atmosphere. The process involves, for many operations, supply heat sufficient to maintain the volatile hydrocarbon components at temperatures of less than 500° F. while allowing substantially complete separation of the volatile hydrocarbons and other contaminants from the material introduced into the thermal desorption unit.

The process further involves withdrawing the vaporized hydrocarbons under vacuum from the thermal desorption unit after which the vapors are treated in one or more cyclone separators to separate small fines which are returned to the processing unit and after which the vapors are condensed and separated for containment or for further use. The solid materials are discharged from the thermal desorption unit through vacuum seals and may be deposited or mixed with water and returned to the environment as non-toxic base soil.

The apparatus of the present invention includes a thermal desorption unit preferably having two sets of concentrically and horizontally mounted cylindrical rotors which define an annular conveying space therebetween. At least one of the cylindrical rotors includes a spiral auger which extends in close proximity with the adjacent rotor and which is used to convey the material between the rotors as they are rotated. In a preferred embodiment, the cylindrical rotors are rotated in the same direction, however, at different speeds to thereby insure that the material does not pack or cake along the side walls of the rotors during the heating process. The rotors are mounted concentrically about one or more centralized heating units which are preferably electric heating elements which are disposed along substantially the entire length of the heat exchange cylinders or rotors.

A feed device maintained under at least partial vacuum is provided for introducing the material into the conveyance space between the first set of rotor cylinders with the amount of material entering being automatically metered by providing openings through the outer cylindrical rotors through which the material passes into the conveyance space therebetween. By varying the rate of rotation of the cylindrical rotors relative to one another, the amount and rate of material being conveyed may be specifically controlled.

The two sets of heat exchange cylinders or rotors are connected by an expansion chamber or cyclone separator wherein flashing of vapors from the material as it leaves the first set of cylindrical rotors is accomplished to further increase the efficiency of hydrocarbon removal from the base material. Both sets of cylindrical rotors and the expansion chamber (or secondary cyclone separator) are connected to a primary cyclone separator so that the vapors being separated during the heating process are continuously drawn, under vacuum, from such units or chambers. The primary cyclone separator separates small material fines from the vapors before the vapors are condensed and stored for either future use or appropriate disposal. The fines are returned to the feed system of the thermal desorption apparatus to be further treated and discharged with material that has been fully processed.

The invention further contemplates that special seals are provided between the vacuum inlet and outlet to the desorption conveyor units and that the cylindrical rotors forming the desorption conveyor units and heat exchangers are axially and radially expandable to compensate for heat variations during material processing without interference with the rotational operation of the rotors.

In another embodiment of the invention, specialized sensing devices such as infrared pyrometers are mounted along the length of each of the sets of rotating cylinders and are used to obtain parametric information with regard to the operational characteristics of the material being treated. The information from the sensors, such as the amount of moisture therein, is fed to a centralized computer which will control the rate of rotation of the conveyance cylinders and therefore the feed rate and conveyance speed of the material through the thermal desorption units so as to insure that, regardless of the moisture content and the amount of contaminants and type of contaminants present in the starting material, the conveyance speed is such as to insure that all contaminant hydrocarbons are effectively vaporized under generally low temperatures prior to the material being discharged from the heat exchange units. Thus, the thermal desorption units are capable of operating in a continuous mode.

It is a primary object of the present invention to provide a vacuum enhanced thermal desorption unit for separating hydrocarbon contaminants from soils wherein the contaminated material is introduced under vacuum into an area of the heating unit which is maintained under reduced pressure so that the volatile components may be separated from the soil at lower processing temperatures than is possible with other thermal recovery units.

It is also an object of the present invention to provide a vacuum enhanced thermal desorption apparatus and method for separating hydrocarbon contaminants from soils which is efficient at temperatures which maintain the vapors at less than 500° F. for most processing operations.

It is yet another object of the present invention to economically remove hydrocarbon contaminants in soils so that the processed soils may be directly discharged and be environmentally safe with the contaminants being efficiently separated for recycling, chemical destruction or other uses as is necessary.

It is yet another object of the present invention to provide a method and apparatus for treating soils which have been contaminated with hydrocarbons including gasoline, kerosine, fuel oils, crude and heating oils, diesel fuels, and the like, wherein the materials are heated to remove the volatile hydrocarbon components under conditions of reduced pressure and wherein various parametric sensors are utilized to determine the condition of the material being conveyed through the apparatus to thereby regulate the effective conveying speed of the apparatus to insure that substantially all contaminants are removed during a single conveyance cycle.

DESCRIPTION OF THE PREFERRED EMBODIMENT

Figure 1:
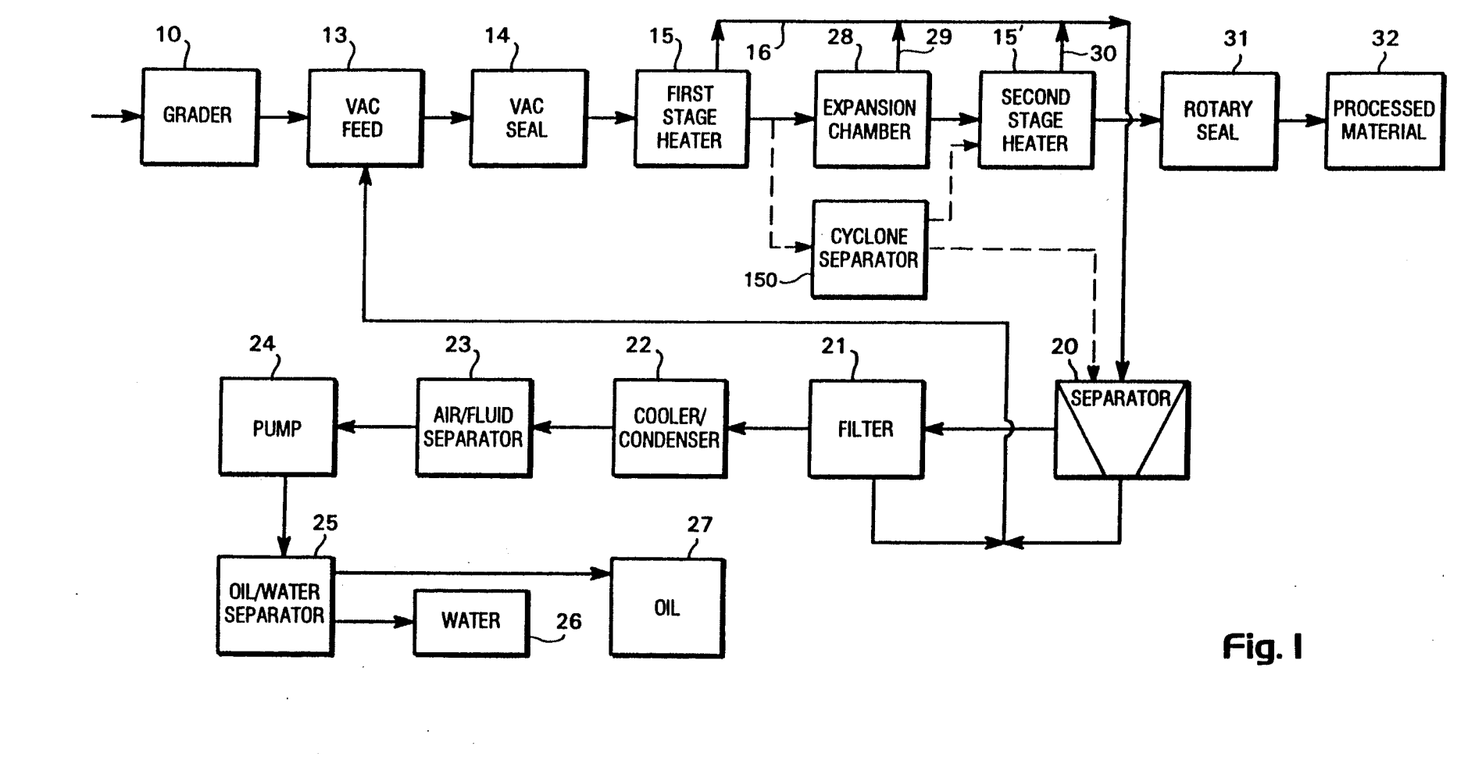
FIG. 1 is a schematic diagram showing the process of the present invention.

With particular reference to FIG. 1, a flow chart diagram is shown representing the process of the present invention. Material such as soil which is contaminated with hydrocarbons including gasolines, diesel fuels and oils, is initially graded to size in any conventional grading apparatus 10. The material, by general size, is thereafter metered into a vacuum enhanced thermal desorption unit 12 by way of a vacuum feed assembly 13. The material which has been graded into various sizes of sand, clays, and rock is retained in the vacuum feed until excess air has been removed from the material after which the material is introduced through a vacuum seal 14 into a first stage heating assembly 15 of the thermal desorption unit. In the first stage heater or heat exchange unit, heat is applied to the material with the heater unit being retained under reduced pressure. Pressures are generally 350 Torr and preferably 300 Torr or less. As the material is conveyed through the first stage heat exchange unit the volatile hydrocarbons are separated as vapors and drawn under vacuum through vapor discharge line 16 to a separator unit which may include one or more cyclone separators 20. In the cyclone separators the vapor is rotated in a swirl action to remove ultra-fine solids which are separated in filter assembly 21. Thereafter, the vapor is introduced into a cooling system or condenser unit 22. Once the vapor has been condensed the air is withdrawn in separator 23 and the liquid is conveyed by pump 24 to a hydrocarbon water separating unit 25 where the oil and other hydrocarbons and water are separated and conveyed to storage in hydrocarbon or oil and water storage units 26 and 27. The hydrocarbons may be broken down into constituents by grade depending upon the need for such separation at an on-site location. The fines are returned through a suitable conveyance line 18 to the vacuum feed assembly 13.

The material being heated in the first stage heat exchanger is maintained at reduced pressure and therefore the amount of heat necessary to vaporize the hydrocarbons is substantially less than with other systems. It has been found that during the operation of test units that vapor temperatures maintained within the first and second stage heat exchangers may vary from approximately 350° for some diesel grades to approximately 700° for various crude oils. Because of the low temperature of vaporization there is little or no chemical change in the hydrocarbons which can thus be condensed and separated for recycling or other use. In addition, the system thereby reduces the amount of energy which must be used in the separation process.

Once the material has passed through the first stage heat exchanger 15, the material is metered into an expansion chamber 28 where additional vapor is flashed from the material and drawn through secondary vapor line 29 into the main vapor line 16 to the separator unit 18. The material is then introduced into a second stage heater 15' which is generally identical to the first stage heater and wherein additional hydrocarbons are vaporized and removed and drawn under vacuum through discharge line 30 to the main vapor collection line 16.

Once substantially all hydrocarbons have been removed from the material, the material is discharged through a rotary vacuum seal 31 and thereafter stored or processed in a processing unit 32. The processing unit 32 may be some type of mixer or chamber wherein moisture is added to the material so that the moisture content of the material is generally the same as the surrounding environment thereby leaving the ecosystem virtually unchanged after the hydrocarbons have been removed. The water for adding to the soil may be supplied as a direct by-product from the oil-water separator.

By way of example, Table 1 sets forth the results achieved by a scale model of the apparatus of the present invention wherein typical soils having contaminants therein as determined by ASTM 503 were treated. The moisture content of the processed soils was approximately 16.7% by weight. Process pressures of 350 Torr or less were maintained in the processing unit during the tests. The process rates are reflected in grams per minute.

TABLE 1

|  | Concentrations | | Vapor | Outer Cylinder | |
|---|---|---|---|---|---|
|  | Initial (PPM) | Final (PPM) | Temperature °F. | Temperature °F. | Process Rate |
| Gasoline | 18,000 | 5 | 453 ± 43 | 883 ± 29 | 7.6 g/m |
| Diesel | 100,000 | 14 | 400 ± 50 | 900 ± 35 | not determined |
| Diesel | 18,500 | 165 | 345 ± 28 | 683 ± 26 | 7.0 g/m |
| Crude Oil | 73,000 | 54 | 402 ± 56 | 910 ± 5 | 7.1 g/m |
| Crude Oil | 9,000 | 63 | 596 ± 24 | 1069 ± 41 | 9.6 g/m |
| Crude Oil | 41,000 | 78 | 692 ± 60 | 1238 ± 35 | 14.3 g/m |

With specific reference to FIGS. 2, 3A, 3B, 4, and 6, the vacuum enhanced thermal desorption unit 12 of the present invention will be disclosed in greater detail. The unit is mounted to a base 40 which may be the bed of a vehicle such as a trailer of a truck so that the unit may be transported from site to site. In some instances, the unit may be fixedly mounted at an on-site location. In the preferred embodiment, the unit includes first and second stage heaters or heat exchangers 15 and 15' which are shown as being horizontally mounted between supporting end walls 41 and 42. Each of the first and second heat exchangers include a pair of concentrically mounted cylinders or rotors 43 and 44, and 45 and 46, respectively, which are rotatably mounted in a manner which will be described in greater detail hereinafter. The spaces between the outer and inner cylinders 43 and 44, and 45 and 46, which are designated at 47 and 48, respectively, define channels in which the contaminated material to be treated will be conveyed. In order to urge the material along the length of the first and second stage heaters, the inner cylindrical heat exchange members 44 and 46 are provided with continuous screw or auger flanges 49 and 50 which extend outwardly so as to be proximate to, but slightly spaced from, the outer heat exchange cylinders 43 and 45. The spacing between the augers 49 and 50 and the walls of the outer cylinders or rotors 43 and 45 is provided to permit vapor to be drawn along the length of the conveying channels 47 and 48 so that vapors may be exhausted through a plurality of openings 51 and 52 which are formed at the end portion of the first heat exchanger 15 and at the beginning portion of the second heat exchanger 15'. The vapors are drawn from the openings through seal rings 53 and 54 into the vapor outlet lines 16 and 30 where the vapors are conveyed to the separating unit 20 as previously discussed.

Figure 2:
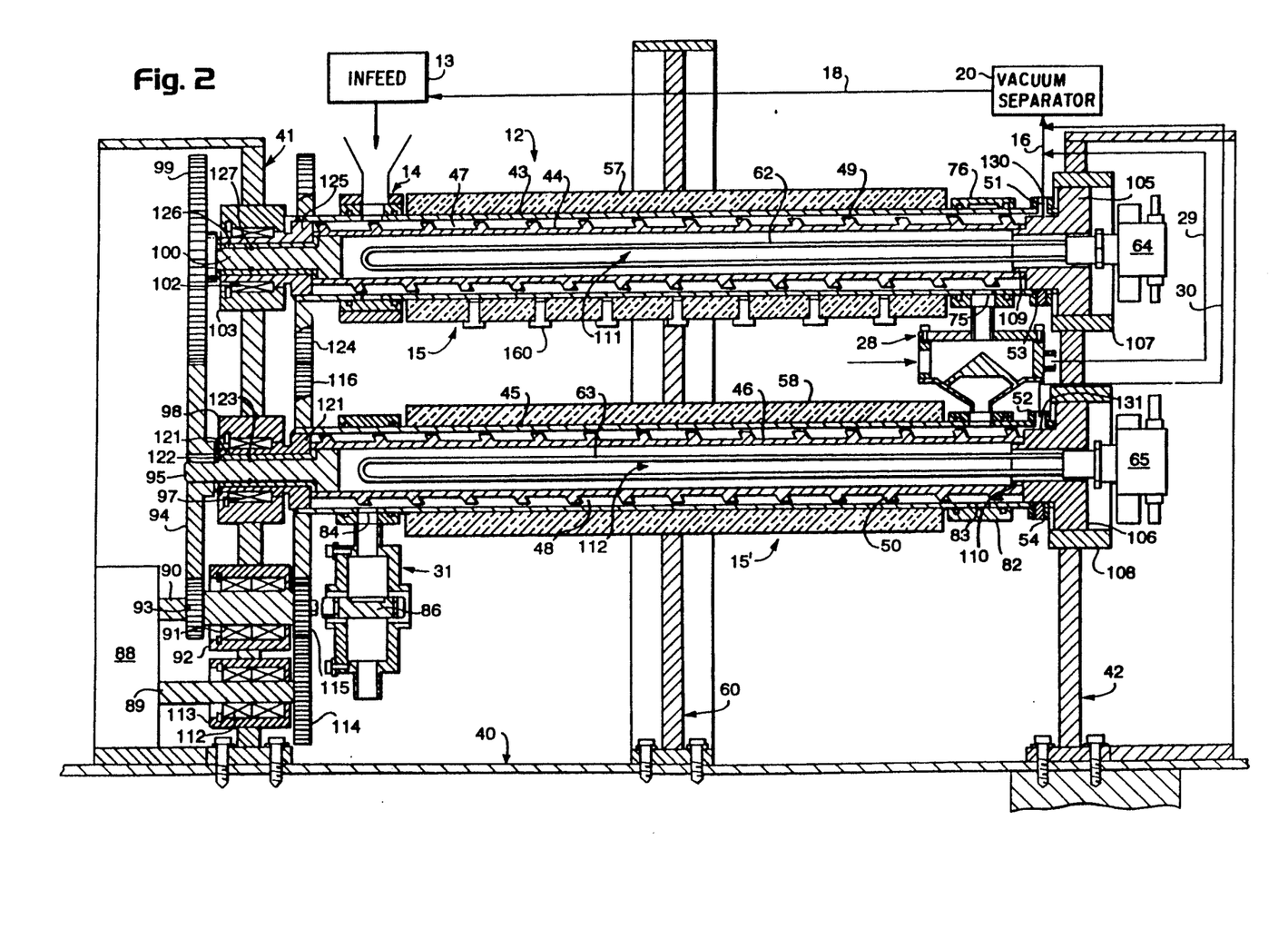
FIG. 2 is a cross-sectional view of the vacuum enhanced thermal desorption unit of the present invention showing two sets of heated conveyors mounted to a common support and showing an in-feed and a vapor vacuum separator in block diagram.

Surrounding each of the outer heat exchange cylinders 43 and 45 are insulation casings 57 and 58. The insulation is supported midway of the length of the first and second heat exchangers by a support assembly 60 which is mounted to the base 40. The insulation casings are fixed to the support 60 and thus do not rotate with the cylinders 43 and 45.

In order to supply heat along the full length of each of the first and second heat exchangers 15 and 15' electrical heating elements 62 and 63 are provided. It is noted that the electrical heating elements extend generally axially of the inner cylinder members 44 and 46. In this manner, all heat generated from the heating element 62 and 63 must pass outwardly through the inner cylinders 44 and 46 of the heat exchangers 15 and 15' and through any material being conveyed within the conveying space 47 and 48 with the dissipation of heat from the heating units being retarded by the outer walls of cylinders 43 and 45 and insulation jackets 57 and 58. In this manner, a very efficient transfer of energy is created making maximum use of the heat generated by the heating element 62 and 63. Each of the heating elements extends from heater control assemblies 64 and 65 which are mounted adjacent the end support wall 42 and which are connected by electrical lines to a source of electrical energy which is not shown.

Material being introduced into the first heat exchanger 15 is metered by way of providing a plurality of inlet openings 68 which are generally equally spaced through the outer cylinder 43 and which communicate with an inlet seal 14. The inlet seal 14 is designed to provide a vacuum seal into the heating unit. The seal is designed to operate at elevated temperatures and is specifically structured so as not provide a heat sink which would reduce the thermal efficiency of the unit. The seal is specifically shown in FIG. 4 of the drawings. The seal includes a pair of spaced wear sleeves 69 and 70 which are manufactured of a low heat conductive material and are secured by suitable adhesive, welding, or fastening means to the outer surface of a pair of spaced flanges 71 and 72 which are either integrally formed with or connected around the outer periphery of the outer cylinder or rotor 43 on either side of the openings 68. The outer surface of the wear sleeve is coated with a material exceeding a hardness level of Rockwell 60 and is highly polished. A steel ceramic contact sleeve 73 is placed about the contact seals 69 and 70 and a sealed jacket (not shown) is provided for water cooling the steel ceramic contact sleeve. Due to the minimum contact between the contact sleeve 73 and seals 69 and 70, heat dissipation from the outer cylinder 43 is reduced to a minimum.

After the material is conveyed through the first stage heat exchanger 15, the material is discharged through another plurality of generally equally spaced openings 75 which are also provided through the outer rotor member 43. The material being discharged through the openings 75 passes through an opening in seal 76 and into an expansion chamber 28. As the material enters the expansion chamber, rapid vapor extraction occurs due to the increased surface area exposure of the solids as they fall toward the second heat exchanger 15'. The expansion chamber 28 is connected by conduit 29 to the vacuum separator 20 and is therefore maintained under vacuum. Fines, which are separated from the vapor in the vacuum separator, may be returned to the material feed unit flow through line 18. The fines returned to the material flow stream are further treated and discharged with the remaining solid materials. In some instances, steam may be introduced into the expansion chamber 28 as shown by the arrow in FIG. 2.

The materials exiting the expansion chamber 28 pass through the opening in a seal 82 surrounding the inlet openings 83 which are provided in equally spaced radial orientation through the outer wall of the outer cylinder 45 of the second heat exchanger 15'. As the material passes into the conveying space 48 of the second heat exchanger, it is conveyed by the spiral flange or auger 50 towards the discharge end of the second heat exchanger. Discharge openings 84 are provided in generally equally spaced orientation through the discharge end of the outer cylinder 45 and communicate with an opening in a seal member 31 so the material passes through the opening into a rotary valve 86 which controls the rate of discharge to collection or processing receptacles generally shown at 32. The rotary valve and seal 31 is designed to provide a vacuum seal at the discharge point of the second heat exchanger as the environment within the second heat exchanger, as with the first heat exchanger, is maintained at a reduced atmosphere by the action of the vacuum separator 18 which is in open communication with the conveying spaces 47 an 48 by way of the openings 51 and 52 through which vapors are withdrawn from each heat exchanger. The rotary valve 86 is connected to a drive shaft (not shown) which is driven at the same rate at the inner cylinders 44 and 46 by gears (not shown).

Figure 3A:
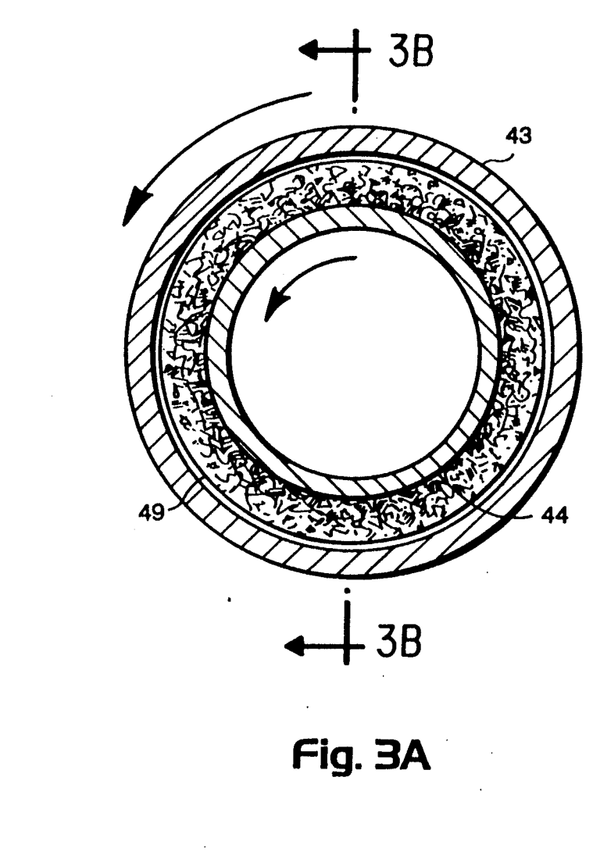
FIG. 3A is an enlarged cross-sectional view taken through one of the sets of rotating cylinders shown in FIG. 2 indicating that both cylinders are rotated in a common direction and yet at different speeds.
Figure 3B:
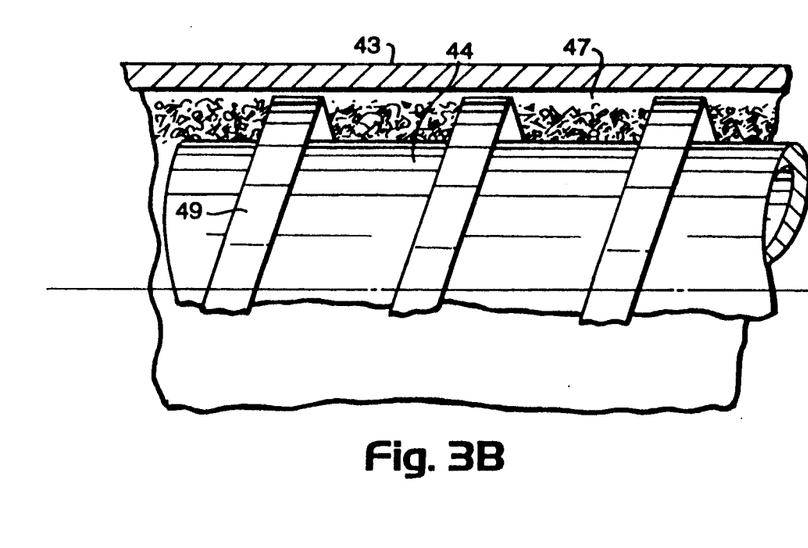
FIG. 3B is a partial cross-sectional view taken along lines 3b—3b of FIG. 3A.
Figure 4:
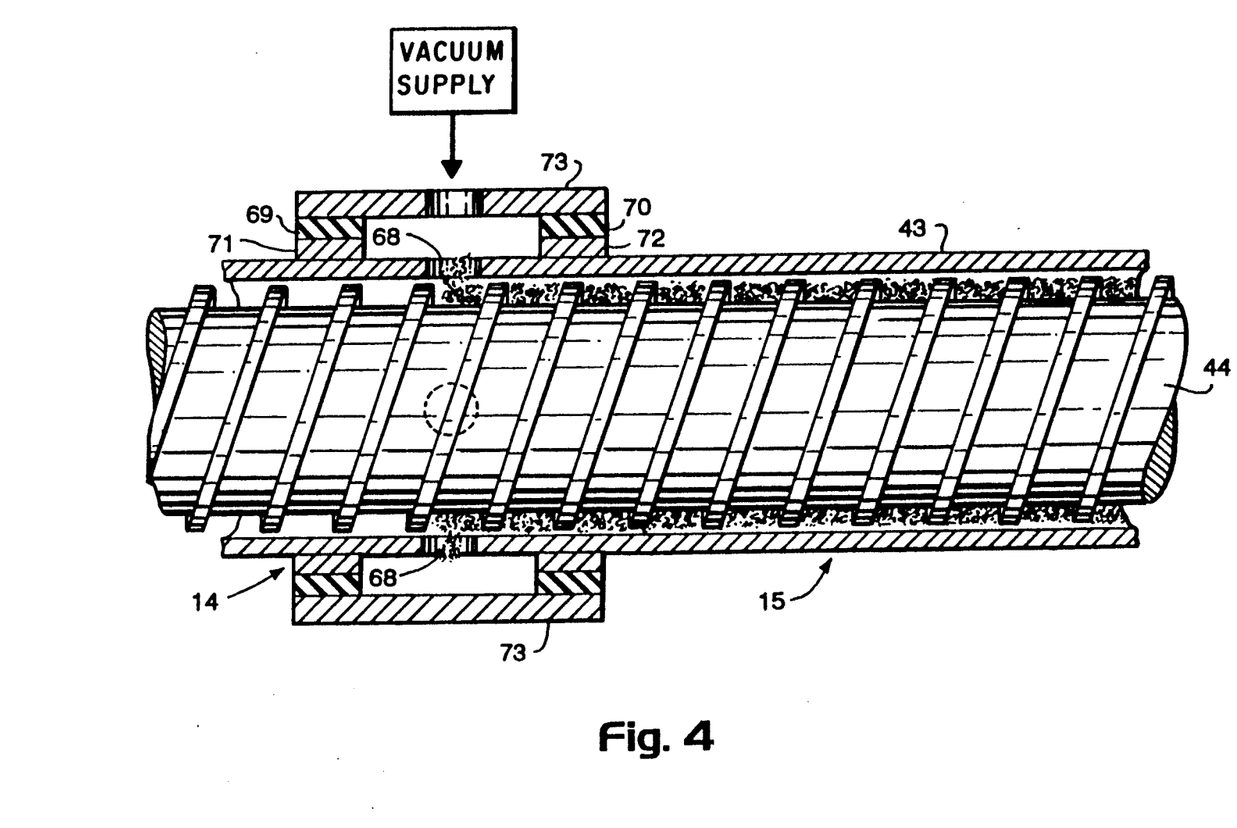
FIG. 4 is a partial cross-sectional view taken at the inlet to the first pair of heat exchange cylinders or rotors showing the heat seals and openings for regulating the feed to the conveying space between the cylinders.

To insure that material being processed does not cake between the rotating cylinders 43 and 44, and 45 and 46, respectively, the cylinders are each mounted so as to be rotated in the same direction, however, they may be rotated at different rates relative to one another as shown in FIGS. 3a and 3b. In the preferred embodiment, the inner rotors or cylinders are rotated at a greater speed than the outer cylinders with the combination of motions allowing the material therebetween to be continuously displaced while not allowing the material to adhere or cake to either pair of rotating cylinders. The relative rate of rotation will vary depending upon the material to be treated as well as the moisture and hydrocarbon content of the material. For materials having relatively large quantities of moisture or hydrocarbons therein, the rate of rotation of the tubes will be slowed so that the retention time within each heat exchange unit 15 and 15' will be increased. As discussed below, various types of sensing devices may be utilized to determine the characteristics of the materials as they are processed to continuously adjust the rotational rates of the inner and outer cylinders of each heat exchanger to insure complete efficiency in hydrocarbon removal at the relatively low heat exchange temperatures developed within the thermal desorption unit of the present invention. Further, as previously discussed, the amount of material being introduced into the openings 70 of the first heat exchanger is partially controlled by the rotational speed of the outer cylinder 43. As the cylinder speed is increased, the amount of material being loaded is also increased.

With reference to FIG. 2, a detailed description of the mounting and rotational controls for the conveyance cylinders of the desorption unit of the present invention are disclosed in greater detail. The unit includes a variable speed gear box 88 which is connected to a conventional motor which may be electrical or gas powered. A pair of input drive shafts 89 and 90 extend from the gear box with each shaft being independently driven so that the rate of rotation of each shaft may be selectively varied by appropriate controls within the gear box 88 (not shown). The input drive shaft 90 is mounted within bearings 91 mounted within bearing housing 92 carried by the end wall 41. A driving sprocket or gear 93 is mounted on one side of the bearings The drive gear 93 is in engagement with a driven gear 94 mounted to a stub shaft 95 to which the inner cylinder 46 is mounted. The stub shaft 95 extends through support bearings 97 mounted in bearing housing 98 also supported within the support wall 41. The driven gear 94 is also in engagement with driven gear 99 mounted to stub shaft 100 which is fixedly connected to the inner cylinder 44 of the first heat exchange unit. The stub shaft 100 is rotatably mounted within bearings 102 which are sealed within bearing housing 103 also mounted within the support wall 41. As shown, upon rotation of the input shaft 90, the drive gear 93 will engage driven gear 94 which is meshed with driven gear 99. Both gears 94 and 99 are of equal diameter so as to drive the stub shafts 95 and 100 at the same rate of rotation and thus drive the cylinders 46 and 44 at the same rate of rotation.

The inner cylinders 44 and 46 are rotationally supported at their opposite ends from the driven gears by support plugs 105 and 106 which are mounted within housings 107 and 108 disposed through the support wall 42. The plugs are rotationally mounted within the housings 107 and 108, and are also slidable within the housings. In this manner, the plugs axially shift under the influence of the expansion and retraction of the outer cylinders which are supported by the plugs as shown in the drawing figures. In this respect, the plugs include inner annular flanges 109 and 110 to which the inner cylinders 44 and 46 are supported. The cylinders 44 and 46 are loosely supported on the flanges 109 and 110 so as to be relatively rotatable with respect to the support plugs. Further, the spacing between the flanges and the cylinders 44 and 46 permits the chambers 111 and 112 defined within the cylinders to be evacuated and thus maintained under vacuum through the action of the vacuum separator 18 which communicates with the cylinders by way of ports or openings 51 and 52. Retaining the heating chambers 111 and 112 under vacuum further increases the heating efficiency of the exchangers 15 and 15' while increasing the life of the heating elements 62 and 63.

As previously discussed, the outer cylinders are generally rotated at a lesser speed or velocity than the inner cylinders. The variable drive gear box 88 permits the relative drive speeds. The input drive shaft 89 is shown as being rotatably mounted within bearings 112 carried by bearings housing 113. The input shaft engages a driven gear 114 which meshes with an intermediate or transfer gear 115 carried by a support shaft (not shown). The transfer gear meshes with a driven gear 116 which is mounted to the outer periphery of the discharge end of the outer cylinder 45 of the second heat exchanger 15'. The outer cylinder 45 is mounted to the bearings 97 by way of a generally cylindrical support shaft 121 which is freely rotatable with respect to stub shaft 95 due to a bearing sleeve 122 mounted therebetween. In order to seal the heating chamber 112, an O-ring assembly 123 is disposed between the stub shaft 95 and the bearing sleeve 122. The outer cylinder 43 of the first heat exchange unit 15 has a driven gear 124 mounted thereto which is of the same configuration as gear 116. The gears 116 and 124 are meshed with one another so that both cylinders 43 and 45 rotate at the same velocity. The cylinder 43 is rotatably mounted with respect to bearings 102 by cylindrical support shaft 125 which is fully rotatable with respect to stub shaft 100 by way of a bearing sleeve 126 mounted therebetween. An 0-ring assembly 127 is provided between the stub shaft 100 and the bearing sleeve 126 to thereby seal the chamber 111.

As previously discussed, the remote ends of the cylinders 43 and 45 are supported by the support or plug members 105 and 106 and are fixedly mounted and sealed with respect to annular body portions 130 and 131 of the support members. As the cylinders 43 and 45 become heated and expand, the support members will slide relative to housing members 107 and 108 and thereby prevent any binding caused by the expansion of the outer cylinders.

Figure 5:
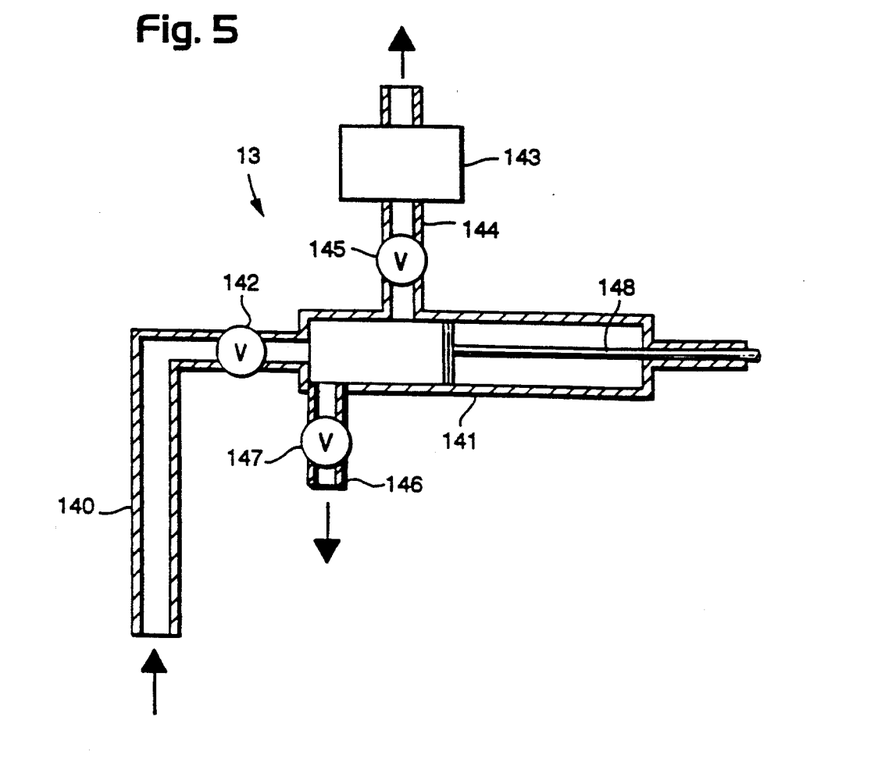
FIG. 5 is a cross-sectional view of the vacuum supply and material feed assembly by way of which contaminated material is introduced into the vacuum enhanced thermal desorption heat treatment conveyors of the present invention.
Figure 6:
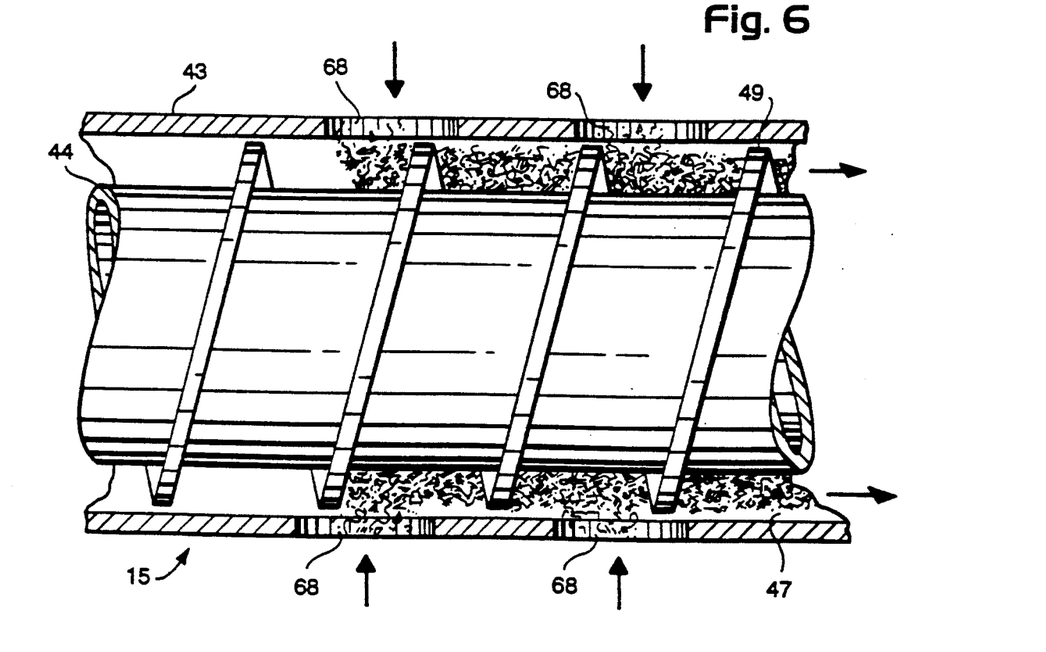
FIG. 6 is an enlarged cross-sectional view indicating the manner in which openings are provided through the outer conveyor cylinder to regulate the feed from the outlet of the vacuum supply feeder shown in FIG. 5.

As previously discussed, the process of the present invention is carried out at reduced atmosphere. Because of this, materials are introduced into the thermal desorption by way of a vacuum loading system 13 shown at FIG. 5. The vacuum loading system includes an intake conduit or hose 140 which is connected to a vacuum chamber 141 by way of valve member 142. The vacuum chamber 141 is connected to a vacuum pump 143 by way of conduit 144 having control valve 145 mounted therein. The vacuum chamber 141 discharges through discharge line 146 into the vacuum seal 14 surrounding the inlet openings 68 in the outer cylinder 43 of the first stage heat exchanger. Another valve 147 is provided along the discharge line 146 for selectively closing the discharge line to the in-feed of the thermal desorption unit. In operation, the valve 147 to the inlet of the first heat exchange unit is closed and valves 145 and 142 open. A piston member 148 is mounted through one side wall of the vacuum chamber and is connected to an activating device (not shown). With valves 145 and 142 opened, the vacuum pump 143 is activated and the piston 148 moved to the right as shown in drawing FIG. 5 thereby serving to further urge material in through the intake line 140 and through valve 142 into the chamber 141. Thereafter, valve 142 is closed and a partial vacuum applied to the material within the chamber 141. Appropriate filters are provided to prevent the escape of any material and hydrocarbons during the removal of excess air from the soil within the chamber 141. Thereafter, pump 143 is deactivated and valve 145 closed and valve 147 to the discharge line 146 opened. Piston member 148 is subsequently driven to the left as shown in FIG. 5 thereby forcing material out through the discharge line 146. In this manner, excess air has been removed from the material to be treated prior to its conveyance into the intake openings 68 of the first heat exchanger 15. Once the material has been urged beyond valve 147 the valve is closed to thereby maintain the vacuum seal with respect to the inlet into the thermal desorption unit. The chamber 141 permits specific volumes of materials to be introduced into the unit.

Figure 7:
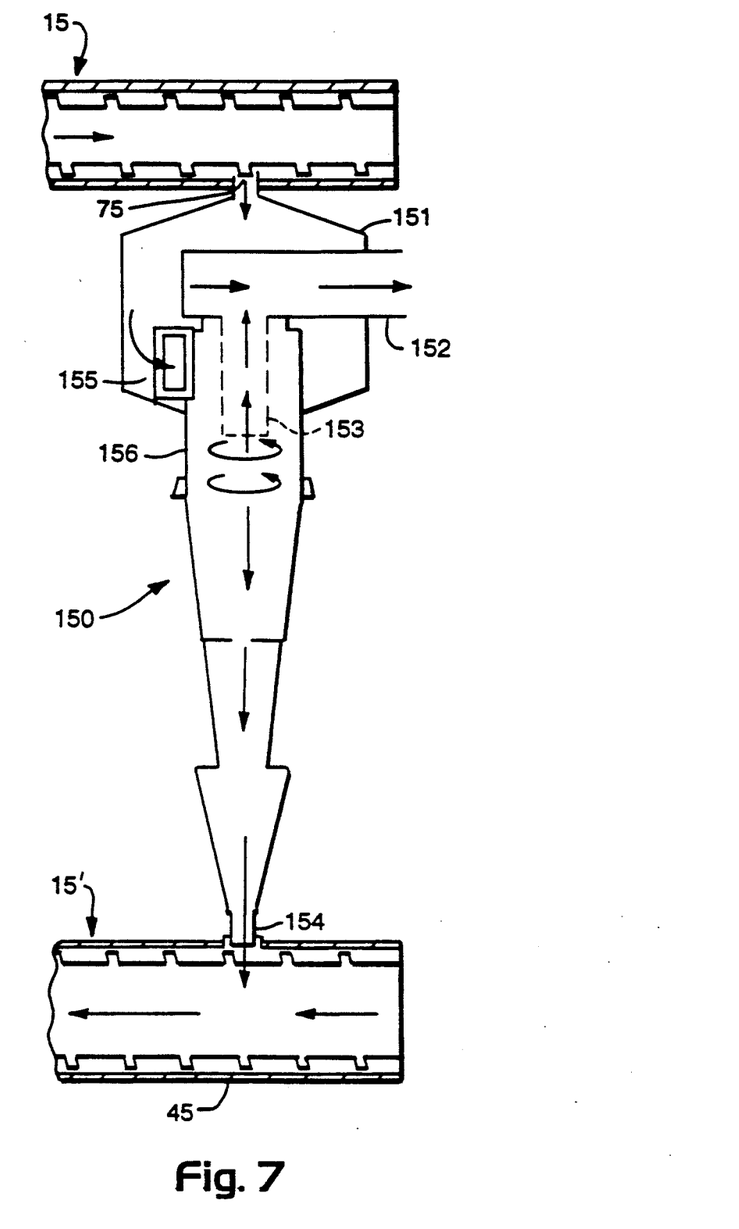
FIG. 7 is a schematic illustrational view of an alternate embodiment using a secondary vapor recovery cyclone system between the sets of cylindrical rotors of the present invention.

With continued reference to FIG. 7 of the drawings, a modification to the thermal desorption unit 12 is disclosed wherein, as opposed to utilizing an expansion chamber such as 28 shown at FIG. 2, a separate or secondary cyclone separator 150 is disposed between the first and second heat exchangers 15 and 15'. The cyclone separator includes an inlet housing 151 which communicates with the discharge openings 75 from the first heat exchanger through which partially processed material and vapors are received. A vapor removal vacuum line 152 extends from the separator 150 to the primary cyclone separator 20 shown in FIG. 1. Depending into the vertical housing of the separator is an intake conduit 153 which communicates with vacuum line 152. The lower portion of the cyclone separator is tapered and has a discharge end 154 which communicates with the opening in seal 82 so as to discharge material into the openings 83 through the outer cylinder 45 of heat exchanger 15'. The material and vapors are introduced at 155 into the separator tangentially with respect to the main housing 156 thereof so that the material and vapor flow is caused to be centrifugal therein. As the material flows through the separator the vapor is exhausted through the vacuum lines 153 and 152 with the solids being conveyed downwardly to the discharge 154.

As previously discussed, the desorption unit of the present invention is specifically designed to permit maximum separation of hydrocarbons from contaminated materials during a single pass of the materials through the pair of heat exchange conveyors 15 and 15'. In order to achieve this, not only is it necessary to control the feed rate of the material into the desorption unit, but it is also necessary to control the rate at which the material is conveyed through the unit and the temperature of the heating elements to insure maximum efficiency in energy usage. As shown in FIG. 2, a plurality of sensing elements 160 are disposed in equally spaced relationship along the length of the outer cylinder 44 of the heat exchanger 15 and are mounted through the insulation jacket 57. As previously discussed, the insulation jacket 57 is not rotated with the outer cylinder 44 and thus the sensors 160 are fixed relative to the rotating cylinder.

Although different types of thermal sensors may be utilized in accordance with the teachings of the present invention, in the preferred embodiment the sensors 160 are infrared pyrometers. The pyrometers are utilized to determine the temperature of the outer cylinder at the points at which the sensors are placed relative thereto. The sensors are connected to a centralized computer (not shown) which will be programmed to not only control the rate of the supply of material into the desorption unit but will also control the relative rotational rate between the inner and outer cylinders 43 and 44, and 45 and 46, to thereby adjust the conveyance rate of the material through the apparatus. The computer will also, based upon the readings obtained from the sensors, control the amount of energy supplied to the heating elements to thereby elevate or reduce the temperature within heat exchangers 15 and 15'. The optimum feed rate, conveyance rate and energy input rate will be selected for each material being introduced into the desorption unit.

Figure 2A:
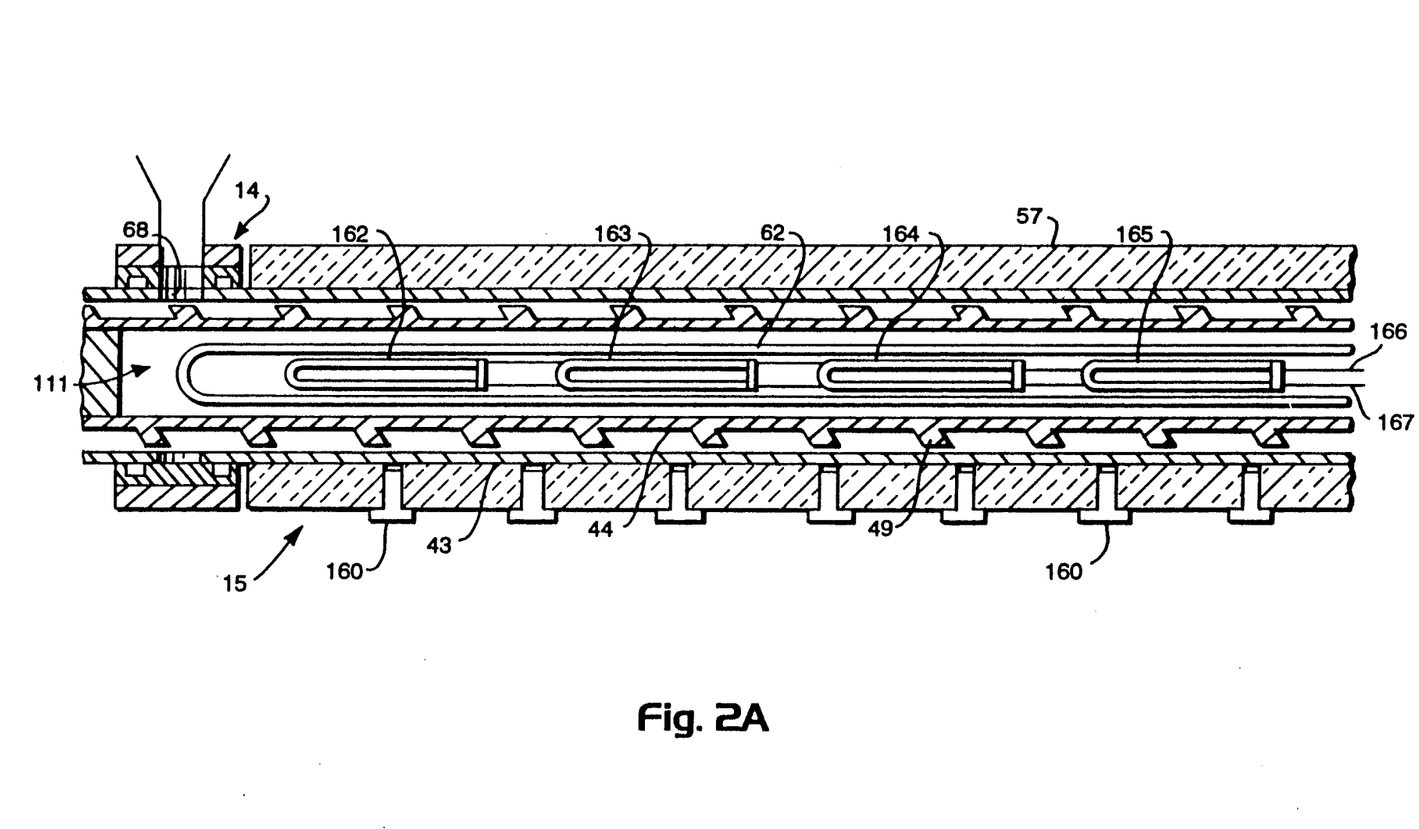
FIG. 2A is an enlarged cross-sectional view of a first of the heat exchange conveyors showing a modified heating system.

With specific reference to FIG. 2A of the drawings, another embodiment of the present invention is disclosed in greater detail. In this embodiment, the heat exchanger 15 is shown in enlarged cross-sectional view and includes the components of the heat exchanger 15 shown in FIG. 2, with the exception of additional heating elements 162, 163, 164 and 165, each of which is connected to separate power leads such as leads 166 and 167 extending to supplemental heating unit 165. In this respect, each of the supplemental heating units 162-165 are independently controllable so as to allow additional heat to be supplied at different points along the length of the heat exchanger. The power to each of the supplemental heating elements as well as the primary heating element 62 will be regulated by the computer system which is connected to the sensors 160 to thereby maintain an optimum heating level as the material is being processed. As previously discussed, the chamber 111 in which the primary and secondary heating elements are located is retained under vacuum. The heating elements operating under high temperatures will tend to oxidize if operated in atmospheric conditions and would fail in very limited time periods. By retaining the heating elements under vacuum, the life of the elements is greatly extended. During operation, the secondary heating elements will allow a stabilization of temperatures throughout the length of the heat exchanger 15.

Although not shown in the drawing figures, in some instances it may be necessary to utilize sensing elements 160 and supplemental heating units such as 162-165 along the length of the second heat exchanger 15' to further control the processing of soils and other materials being conveyed through the desorption unit of the present invention.

I claim:

1. A method of recovering hydrocarbons from soils in which the soils are heated in a desorption unit which includes an outer housing having a conveyance device extending inwardly thereof so that material is moved longitudinally of a heat exchanger from an inlet to a discharge end thereof including the steps of:
 a) introducing a quantity of soil into the heat exchanger;
 b) applying at least a partial vacuum within the heat exchanger so that the soil is being processed under at least partial vacuum;
 c) heating the soil within the heat exchanger to a temperature sufficient to vaporize hydrocarbons while simultaneously conveying the soil within the heat exchanger;
 d) withdrawing the vaporized hydrocarbons from the heat exchanger;
 e) separating the vaporized hydrocarbons from any solids and other liquids; and
 f) discharging the treated soil from the heat exchanger.

2. The method of claim 1 including the additional step of grading the soils by size before introducing the soils into the heat exchanger.

3. The method of claim 1 including the additional step of introducing a quantity of soil into a charged forming chamber and thereafter at least partially evacuating air from the soil under at least partial vacuum and thereafter introducing the soil under at least partial vacuum into the heat exchanger.

4. The method of claim 1 including sensing the temperature of the outer housing of the heat exchanger to thereby continuously adjust the feed rate of soil into the heat exchanger.

5. The method of claim 1 including sensing the temperature of the outer housing of the heat exchanger to thereby control the conveyance rate of the soil through the heat exchanger.

6. The method of claim 1 including adjusting the rate of conveyance within the heat exchanger to thereby simultaneously adjust the rate of feed of soils into the heat exchanger.

7. The method of claim 1 wherein the soil is conveyed through an annular chamber defined about a source of heat whereby the heat must pass through the material before being dissipated through the outer housing of the heat exchanger.

8. The method of claim 1 including regulating the amount of heat applied to the soil within the heat exchanger at separate zones defined along the length of the heat exchanger.

9. The method of claim 1 including discharging the soil from the heat exchanger into a chamber wherein the soil may be rapidly expanded to further vaporize hydrocarbons therefrom and withdrawing vapors from the chamber and thereafter discharging the soil from the chamber.

10. The method of claim 9 including the additional step of introducing the soil from the chamber into a second heat exchanger and applying at least a partial vacuum within the second heat exchanger while simultaneously heating and conveying the soil along the length of said second heat exchanger to further vaporize hydrocarbons from the soil, recovering the vapor from the second heat exchanger and discharging the soil material from the second heat exchanger.

11. The method of claim 10 including recovering the vapors from said second heat exchanger under at least partial vacuum and thereafter separating the hydrocarbons from soil fines and water.

12. The method of claim 11 in which the pressure within the first and second heat exchangers is maintained at 350 Torr or less.

13. The method of claim 12 in which the temperature of the vaporized hydrocarbon is generally maintained between 350° F. to less than 800° F.

14. The method of claim 1 in which the pressure within the first and second heat exchangers is maintained at 350 Torr or less.

15. The method of claim 14 in which the temperature of the vaporized hydrocarbon is generally maintained between 350° F. to less than 800° F.

16. An apparatus for recovering hydrocarbons from soils comprising, at least one heat exchange means, said heat exchange means including an outer elongated housing defining an enclosed chamber and having inlet and discharge ends, at least one opening into said inlet end of said housing and at least one discharge opening through said discharge end, at least one heating element disposed generally along the length of said housing and generally centrally thereof, a conveyance means mounted within said housing for conveying material introduced therein from said inlet opening to said discharge opening, drive means for driving said conveyance means so as to selectively regulate the rate of conveyance of the soils from said inlet to said discharge openings, and vacuum separator means for withdrawing and separating vapors from soil chambers and for retaining said chamber defined by said housing under at least a partial vacuum whereby the soil being heated is maintained at less than atmospheric pressure to thereby facilitate the vaporization of hydrocarbons therefrom during the conveyance of the soils though said heat exchanger.

17. The apparatus of claim 16 including a vacuum feed means for introducing the soil into said inlet openings of said heat exchanger.

18. The apparatus of claim 17 in which said vacuum feed means includes a chamber, means for introducing soil contaminated with hydrocarbons into said chamber, means for sealing said chamber from atmosphere, means for evacuating air from said contaminated soil, and means for conveying the evacuated contaminated soil from said evacuation chamber and into said inlet opening of said heat exchanger.

19. The apparatus of claim 18 including a vacuum seal means disposed between said vacuum feed means and said inlet opening in said heat exchanger.

20. The apparatus of claim 19 in which said vacuum seal means includes a pair of seal elements spaced on either side of said inlet opening into said heat exchanger, said seal elements being formed of low thermal conductive material, and means for securing said seal elements in sealed relationship with respect to said housing of said heat exchanger.

21. The apparatus of claim 16 in which said heat exchanger includes an inner generally cylindrical rotor and said outer housing being formed as an outer cylindrical rotor, said outer cylindrical rotor being spaced from inner cylindrical rotor so as to form a conveyance space therebetween, said conveyance means including a spiral auger extending from one of said inner and outer cylindrical rotors in proximate and spaced relationship to the other of said inner or outer cylindrical rotors and within said conveyance space, said auger extending from adjacent said inlet end to said discharge end of said heat exchanger, and said drive means being operable to rotate said inner and outer cylindrical rotors relative to one another at variable rates.

22. The apparatus of claim 21 in which said at least one heating element is disposed generally axially of said inner cylindrical rotor.

23. The apparatus of claim 22 including means for evacuating the area within said inner cylindrical rotor to thereby form at least a partial vacuum surrounding said heating element.

24. The apparatus of claim 23 including a plurality of heating elements spaced along the length of said heat exchanger.

25. The apparatus of claim 24 including a first heating element extending generally along the length of said heat exchanger and a plurality of second heating elements intermittently spaced along the length of said heat exchanger.

26. The apparatus of claim 25 including sensor means for monitoring the temperature of said outer cylindrical rotor, means for connecting said detector means to a control means, means for connecting said control means to said drive means whereby the relative rate of rotation of said outer and inner cylindrical rotors is at least partially controlled in response to said sensor means.

27. The apparatus of claim 22 including sensor means for monitoring the temperature of said outer cylindrical rotor, means for connecting said detector means to a control means, means for connecting said control means to said drive means whereby the relative rate of rotation of said outer and inner cylindrical rotors is at least partially controlled in response to said sensor means.

28. The apparatus of claim 22 including an expansion chamber means, means for connecting said expansion chamber means in sealed communication with said discharge opening of said heat exchanger, and means for conveying vapors from said expansion chamber to said vacuum separator means.

29. The apparatus of claim 28 including a second heat exchange means having inlet and discharge ends, at least one inlet opening adjacent said intake end and at least one discharge opening adjacent said discharge end, means for connecting said inlet opening of said second heat exchange means with said expansion chamber to receive soil therefrom, means for evacuating said second heat exchanger so that vapors may be exhausted therefrom to said vacuum separator means and means for conveying said soils from said inlet opening to said discharge opening of said second heat exchange chamber.

30. The apparatus of claim 29 including a rotary vacuum seal discharge means, said rotary vacuum seal discharge means being mounted in overlaying relationship to said discharge opening of said second heat exchange means.

31. An apparatus for separating hydrocarbons from soils through the application of heat to vaporize the hydrocarbons from the soil comprising, at least one heat exchanger conveyor means having inner and outer cylindrical rotors having an annular conveyance space defined therebetween, each of said inner and outer cylinders having first and second ends, at least one inlet opening through said first end of said outer cylindrical rotor and at least one discharge opening through said second end thereof, auger means extending from one of said inner and outer cylindrical rotors towards the other of said inner and outer cylindrical rotors and spaced from said other of said inner and outer cylindrical rotors and within said conveyance space, at least one heating means disposed within and generally centrally of said inner cylindrical rotor, a vacuum separator means in open communication with said conveyance space for separating vapors from said conveyance space and for maintaining said conveyance space under at least partial vacuum, vacuum seal means for sealing said inlet opening in said outer cylindrical rotor, and variable drive means for rotating said inner cylindrical rotor and said outer cylindrical rotor at variable drive rates with respect to one another.

32. The apparatus of claim 31 including means for venting the interior of said inner cylindrical rotor to said vacuum separator means whereby said interior thereof is maintained at least at partial vacuum.

33. The apparatus of claim 31 in which said drive means is connected to one of said first or second ends of said first and second cylindrical rotors, the other of said first and second ends of said cylindrical rotors being supported by a plug means, housing means for supporting said plug means, said plug means being axially movable with respect to said housing to thereby allow for the elongation of said first and second cylindrical rotors due to the application of heat.

34. The apparatus of claim 31 including a secondary separator means, said secondary separator means being mounted in communication with said discharged opening in said outer cylindrical rotor so as to receive soils and vapors discharged therefrom, means for venting said second separator means to said vacuum separator means to thereby convey vapors to said vacuum separator means and discharge means from said secondary separator means through which soils may be discharged.

35. The apparatus of claim 34 including a second heat exchange conveyor means having inner and outer cylindrical rotors, said outer cylindrical rotor having at least one inlet opening adjacent one end thereof and at least one outlet opening adjacent the other end thereof, a second conveyance space defined between said inner and outer cylindrical rotors of said second heat exchange conveyor means, auger means extending from one of said inner and outer cylindrical rotors towards the other of said inner and outer cylindrical rotors for conveying material along the length thereof, said discharge means of said secondary separator means communicating with said inlet opening into said outer cylindrical rotor, means for connecting said second conveyance space with said vacuum separator means, valve means mounted adjacent the other end of said outer cylindrical rotor for receiving material through said at least one discharge opening, and drive means for driving said inner cylindrical rotor of said second heat exchange conveyor means at the same rate as said inner cylindrical rotor of said first heat exchange conveyor means and for driving said outer cylindrical rotor of said second heat exchange conveyor means at the same rate as said outer cylindrical rotor of said first heat exchange conveyor means.

36. The apparatus of claim 35 including a plurality of sensor means disposed along the length of said outer cylindrical rotor of said first heat exchange conveyor means and means connecting said sensor means to a control means for regulating the drive means of said inner and outer cylindrical rotor of said first heat exchange conveyor means.

37. The apparatus of claim 31 including vacuum feed means for supplying soils to said inlet opening of said outer cylindrical rotor, said vacuum feed means including a chamber means, means for evacuating air from within said chamber means and means communicating said chamber means with said inlet opening of said outer cylindrical rotor of said first heat exchange conveyor means.

38. Method of recovering hydrocarbons from soils in which soils are heated in a desorption unit which includes a heat exchange conveyor having inner and outer rotatable cylinders having a conveyance spaced defined therebetween and wherein one of the inner and outer cylinders includes an auger for urging soil along said conveyance space between an inlet and an outlet formed in the outer cylinder comprising the steps of:
 a) introducing a quantity of soil into the inlet opening of the outer cylinder;
 b) applying at least a partial vacuum within the conveyance space so that the soil being processed therein is processed under at least partial vacuum;
 c) supplying heat centrally with respect to said inner cylinder in amounts sufficient to vaporize hydrocarbons from the soil while conveying the soil from said inlet toward said outlet in said outer cylinder;
 d) withdrawing the vaporized hydrocarbons from the conveyance space; and
 e) discharging the treated soil from the heat exchange conveyor.

39. The method of claim 38 including steps of rotating the inner and outer cylinders at different rates with respect to one another to thereby prevent the caking of soil on said inner and outer cylinders.

40. The method of claim 39 including the additional steps of discharging the soil from the heat exchange conveyor and flash vaporizing hydrocarbons from the soil in a secondary separation chamber and thereafter discharging the soils into a second heat exchange conveyor means having inner and outer rotating cylinders, supplying heat within said second heat exchange chamber centrally of said inner cylinder, withdrawing vaporized hydrocarbons from said second heat exchange conveyor while simultaneously conveying soils therethrough and discharging the soils from said second heat exchange conveyor.

* * * * *